United States Patent [19]
McCollum

[11] Patent Number: 5,160,639
[45] Date of Patent: Nov. 3, 1992

[54] LIME-TREE PREFORMED SHAPES FOR CASTING ALUMINUM

[76] Inventor: J. Michael McCollum, 2608 Matterhorn Dr., Wexford, Pa. 15090

[21] Appl. No.: 719,067

[22] Filed: Jun. 17, 1991

Related U.S. Application Data

[63] Continuation of Ser. No. 477,053, Feb. 7, 1990, abandoned.

[51] Int. Cl.$^5$ .............................................. C04B 35/02
[52] U.S. Cl. ..................................... 222/591; 501/95; 501/127; 266/280
[58] Field of Search .................. 501/95; 266/280, 286

[56] References Cited

U.S. PATENT DOCUMENTS 4,510,253  4/1985  Felice et al. ......................... 501/95

Primary Examiner—Scott Kastler

[57] ABSTRACT

Preformed silica shapes such as pins and spouts useful in the casting of molten aluminum are provided by which a high strength chemical bond is developed by adding 2 to 10 wt. % of an alkali phosphate-modified aluminosilicate binder to a fused silica mix. To this silica and binder mix, sufficient water is added to obtain a castable consistency. Then, a shape is cast, dried, and shipped for service.

14 Claims, 1 Drawing Sheet

LIME-TREE PREFORMED SHAPES FOR CASTING ALUMINUM

This application is a continuation of application Ser. No. 07/477,053, filed 02/07/1990, now abandoned.

BACKGROUND OF THE INVENTION

This invention relates to preformed silica shapes and, more particularly, it concerns lime-free preformed shapes which are useful in the casting of molten aluminum.

Preformed refractory pins and spouts made from fused silica are typically used for casting molten aluminum into ingots. In the casting process, molten aluminum flows from a trough into a spout and from the spout into an ingot casting mold. The rate of metal flow is controlled by raising or lowering a pin which is located in the middle of the spout along its vertical axis (FIGS. 1 and 2). Fused silica is the preferred composition of these pins and spouts because of its inherently high thermal shock resistance and its relatively good resistance to molten aluminum. High thermal shock resistance is important in this application since the pins are thermally cycled when they are lowered into and raised out of the molten aluminum.

Typically, the above-mentioned silica pins and spouts are made by slip casting. In this process, fused silica is milled with water until the slip has a free flowing consistency. The slip has a solids content of about 89% and is sized −50 mesh. After casting into plaster of paris molds, the shapes are dried and fired to about 2000° F. in order to develop a ceramic bond. The disadvantages of this operation are twofold: first, the casting is restricted to plaster molds which tend to have limited life because of their low strength and, second, firing of the shape to a high temperature is required in order to develop strength.

In light of the foregoing, there is a need for improved preformed silica shapes which are adapted to the casting of molten aluminum.

SUMMARY OF THE INVENTION

In accordance with the present invention, preformed silica shapes such as pins and spouts useful in the casting of molten aluminum are provided by which a high strength chemical bond is developed by adding 2 to 10 wt. % of an alkali phosphate-modified alumino-silicate to the mix. To this mix, sufficient water is added to obtain a castable consistency. The shape is cast and dried, and then shipped for service.

Among the objects of the present invention are, therefore, the provision of lime-free preformed shapes and a method of manufacture which eliminates the need for a high temperature firing step during manufacture. Another object of the invention is to provide such a method and apparatus which accommodates the use of not only plaster molds, but also non-plaster molds such as wood, plastic, metal, or the like. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
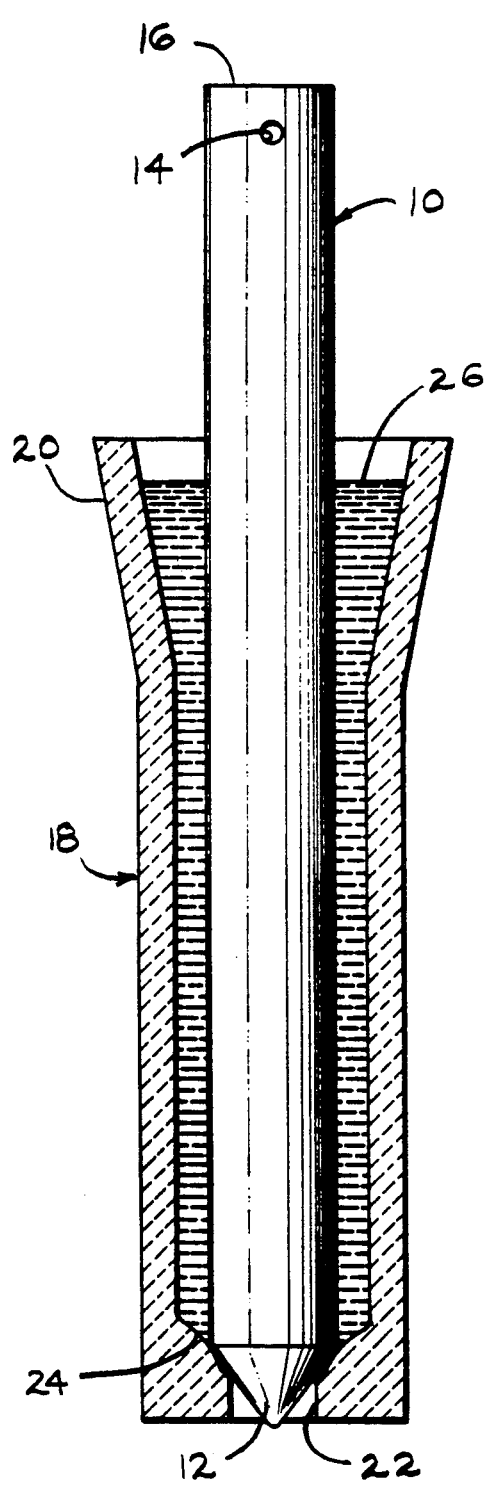
FIG. 1 is a partial cross section illustrating a preformed silica pin and spout arrangement with the pin blocking the discharge orifice in the spout; and, FIG. 2 is a partial cross section representing the preformed silica pin and spout arrangement of FIG. 1 with the pin in a raised, molten metal dispensing position.

The above-mentioned disadvantages of conventional slip casting techniques have been overcome in accordance with the present invention by adding a small amount of an alkali phosphate-modified alumino-silicate to the fused silica mix. This additive is provided in amounts varying from about 2 to 10 wt. % of the dry mix. An analysis of this binder is shown in Table 1.

Such a binder is sold by Zschimmer Schwarz of Lahnstein, West Germany, under the trademark LITHOPIX AS85.

TABLE 1

| Analysis of Alkali Phosphate Modified Alumino-Silicate Binder | |
| --- | --- |
| Silica ($SiO_2$) | about 56% |
| Alumina ($Al_2O_3$) | about 25 |
| Phosphorous Pentoxide ($P_2O_5$) | about 8 |
| Potash ($K_2O$) | about 9 |

Table 2 contrasts a fused silica shape containing 3 wt. % of this binder to a fused silica shape wholly composed of fused silica. This table shows that after simple drying, the shapes containing the binder possess strength equivalent to that obtained in fired shapes. Hence, use of this binder is advantageous in that it eliminates the need for ceramic bonding which is achieved by firing. In addition, adequate handling strength is achieved in about 1 hour after mixing the binder of the present invention with aggregate and adding water. This eliminates the necessity of using plaster molds which are required in conventional slip or vibration casting to draw water from the mix and give the shape adequate handling strength. Using the binder of the present invention, a set can be achieved in molds of any composition such as wood, metal, plastic, or plaster.

TABLE 2

| Properties of Fused Silica Shapes Made with the Lime-free Binder | | |
| --- | --- | --- |
| Post Casting Treatment | Fused Silica Shape with 3% Binder Unfired, only Dried | 100% Fused Silica Shape Fired |
| Bulk Density, pcf | 117–119 | 117–121 |
| Modulus of Rupture, psi | | |
| After 250° F. | 1310–1400 | — |
| After 1500° F. | 2000 | — |
| After 2000° F. | 1100 | 1400–2200 |
| Cold Crushing Strength, psi | | |
| After 250° F. | 5420 | — |
| After 1500° F. | 7370 | — |
| After 2000° F. | 6490 | 6000–10,000 |
| Apparent Porosity, %: | | |
| After 250° F. | 12.8 | — |
| After 1500° F. | 13.4 | — |
| After 2000° F. | 11.5 | 11–15 |
| Linear Change, % | | |
| After 1500° F. | 0.0 | — |
| After 2000° F. | −0.2 | 0.0 |
| Volume Change, % | | |
| After 1500° F. | −0.2 | — |
| After 2000° F. | −0.5 | 0.0 |
| Linear Coefficient of | $0.4 \times 10^{-6}$ | $0.4 \times 10^{-6}$ |

TABLE 2-continued

Properties of Fused Silica Shapes Made with the Lime-free Binder

| Post Casting Treatment | Fused Silica Shape with 3% Binder Unfired, only Dried | 100% Fused Silica Shape Fired |
|---|---|---|
| Thermal Expansion, Room Temperature to 1832° F., in/in/°F. | | |
| Chemical Analysis | | |
| Silica (SiO$_2$) | 98.3% | 99.6% |
| Alumina (Al$_2$O$_3$) | 0.95 | 0.25 |
| Iron Oxide (Fe$_2$O$_3$) | 0.05 | 0.05 |
| Lime (CaO) | 0.02 | 0.03 |
| Magnesia (MgO) | 0.01 | 0.02 |
| Phosphorous Pentoxide (P$_2$O$_5$) | 0.25 | — |
| Alkalies (Na$_2$O + K$_2$O) | 0.28 | 0.02 |
| Total | 99.9% | 100.0% |

Although the data shown in Table 2 was obtained on vibration cast shapes which were made from −8 mesh grains, it is to be understood that the lime-free binder of the present invention can be added to conventional slip cast mixes.

Figure 2:
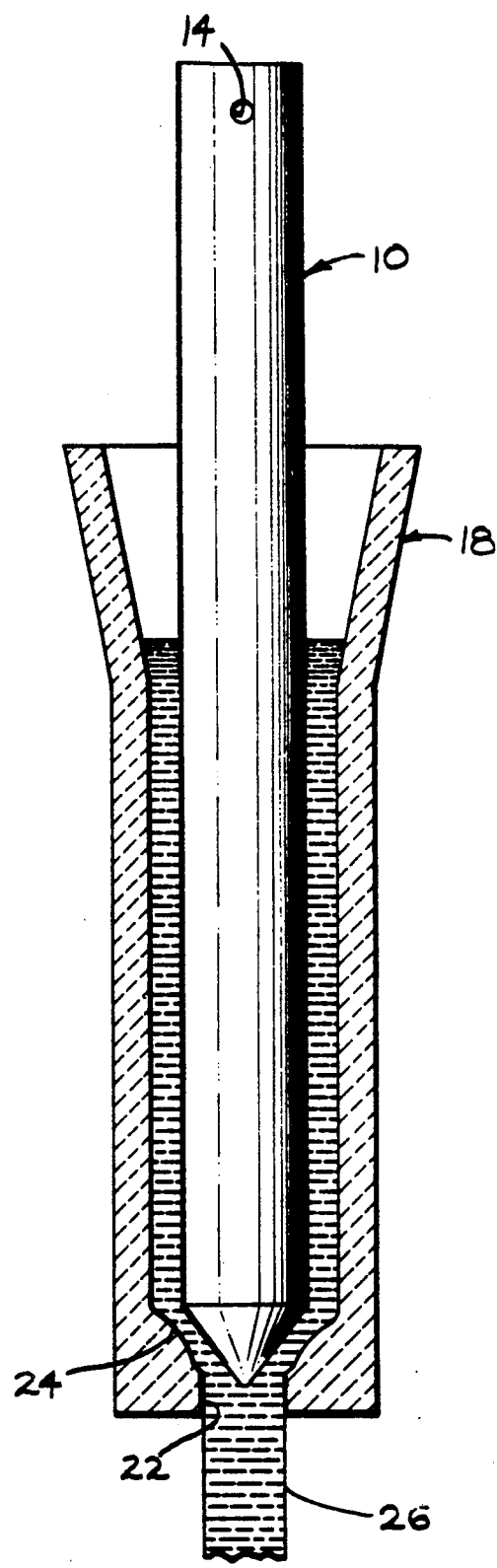

In FIGS. 1 and 2 of the drawings and in accordance with an exemplary embodiment of the present invention, an elongate, cylindrical pin 10 having a tapered lower end 12 and a through hole 14 adjacent a planar upper end 16 is shown received within a spout 18 having a fluted upper end 20 and a cylindrical discharge opening 22. In the position shown in FIG. 1, the tapered or conical end 12 of the pin 10 contacts a flow regulating curved annular surface 24 adjacent the discharge opening 22 and, thereby, blocks the discharge of molten metal 26 from the spout 18. When the pin 10 is raised by a means (not shown) extending through the opening 14, molten metal 26 flows through the discharge opening 22 in the spout 18 (FIG. 2). The rate of molten metal discharge from the spout 18 is controlled by varying the distance the pin 10 is raised and, as such, varying the annular gap between the tapered end 12 of the pin 10 and the curved surface 24 of the spout 18. In accordance with the present invention, the pin 10 and spout 18 are made from a fused silica mix containing from about 2 to 10 wt. % of an alkali phosphate-modified alumino-silicate binder.

In accordance with the preferred embodiment, the length of the preformed silica pin 10 falls within a range of from about 15 to 36 inches, the diameter of the pin 10 lies within a range of about 1 to 2 ½ inches, and the through hole 14 is about ¼ inch in diameter. In accordance with the same preferred embodiment, the overall height of the preformed silica spout 18 falls within a range of approximately 10 to 18 inches, the average wall thickness (for example, in the area of the fluted upper end 20) of the spout 18 lies within a range of from about ½ to 1 inch, the outer diameter of the base of the spout ranges from about 2 to 5 inches, and the discharge opening 22 has diameter within a range of about ¾ to 1 ½ inches.

Thus, it will be appreciated that as a result of the present invention, highly effective lime-free preformed shapes and method are provided and by which the stated objectives, among others, are completely fulfilled. It is contemplated that modifications and/or changes may be made in the illustrated embodiment without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. An amorphous silica shape used in the casting of molten aluminum, comprising: 2 to 10 wt. % of an alkali phosphate modified alumino-silicate binder wherein said binder develops adequate strength for handling and service conditions after simple drying and accommodates the use of plastic and non-plaster molds.

2. A shape according to claim 1, wherein the amorphous silica consists essentially of fused silica or vitreous silica or combinations thereof.

3. A method for manufacturing a preformed lime-free silica shape useful in the casting of molten aluminum from a dry silica mix, comprising the steps of:
   adding 2 to 10 wt. % of an alkali phosphate-modified alumino-silicate binder to the dry mix wherein said binder develops adequate strength for handling and service conditions after simple drying and accommodates the use of plaster and non-plaster molds,
   adding a sufficient quantity of water to the silica and binder mix to produce a mixture having a castable consistency,
   casting the mixture into a mold conforming to the desired shape, and
   drying the cast shape.

4. In a fused silica shape for use in the casting of aluminum, the improvement comprising:
   an alkali phosphate-modified alumino-silicate binder wherein said binder develops adequate strength for handling and service conditions after simple drying and accommodates the use of plastic and non-plaster molds.

5. The silica shape of claim 4, wherein said binder comprises about 2 to 10 dry wt. % of the mix.

6. The silica shape of claim 5, wherein said binder comprises about 56% silica, 25% alumina, 8% phosphorous pentoxide, and 9% potash.

7. In a process for producing a fused silica shape for use in the casting of aluminum, the improvement comprising the step of:
   adding an alkali phosphate-modified alumino-silicate binder to the mix wherein said binder eliminates the need for a high temperature firing step and accommodates the use of plaster and non-plaster type molds.

8. The process of claim 7, wherein said binder is added in an amount of about 2 to 10 dry wt. % of the mix.

9. The process of claim 8, wherein said binder comprises about 56% silica, 25% alumina, 8% phosphorous pentoxide, and 9% potash.

10. In a fused silica mix for making a shape for use in the casting of aluminum, the improvement comprising:
    the addition of an alkali phosphate-modified alumino-silicate binder wherein said binder develops adequate strength for handling and service conditions after simple drying and accommodates the use of plaster and non-plaster molds.

11. The silica mix of claim 10, wherein said binder is added in an amount of about 2 to 10 dry wt. % of the mix.

12. The silica mix of claim 11, wherein said binder comprises about 56% silica, 25% alumina, 8% phosphorous pentoxide, and 9% potash.

13. The shape according to claim 1, wherein said shape is a pin.

14. The shape according to claim 1, wherein said shape is a spout.

* * * * *

UNITED STATES PATENT AND TRADEMARK OFFICE
CERTIFICATE OF CORRECTION

PATENT NO. : 5,160,639

DATED : November 3, 1992

INVENTOR(S) : J. Michael McCollum

It is certified that error appears in the above-identified patent and that said Letters Patent is hereby corrected as shown below:

On the title page, item [54], and column 1, line 2, change "TREE" to --FREE--.

Signed and Sealed this

Fifteenth Day of February, 1994

Attest:

BRUCE LEHMAN

*Attesting Officer*   Commissioner of Patents and Trademarks